United States Patent Office 3,091,352
Patented May 28, 1963

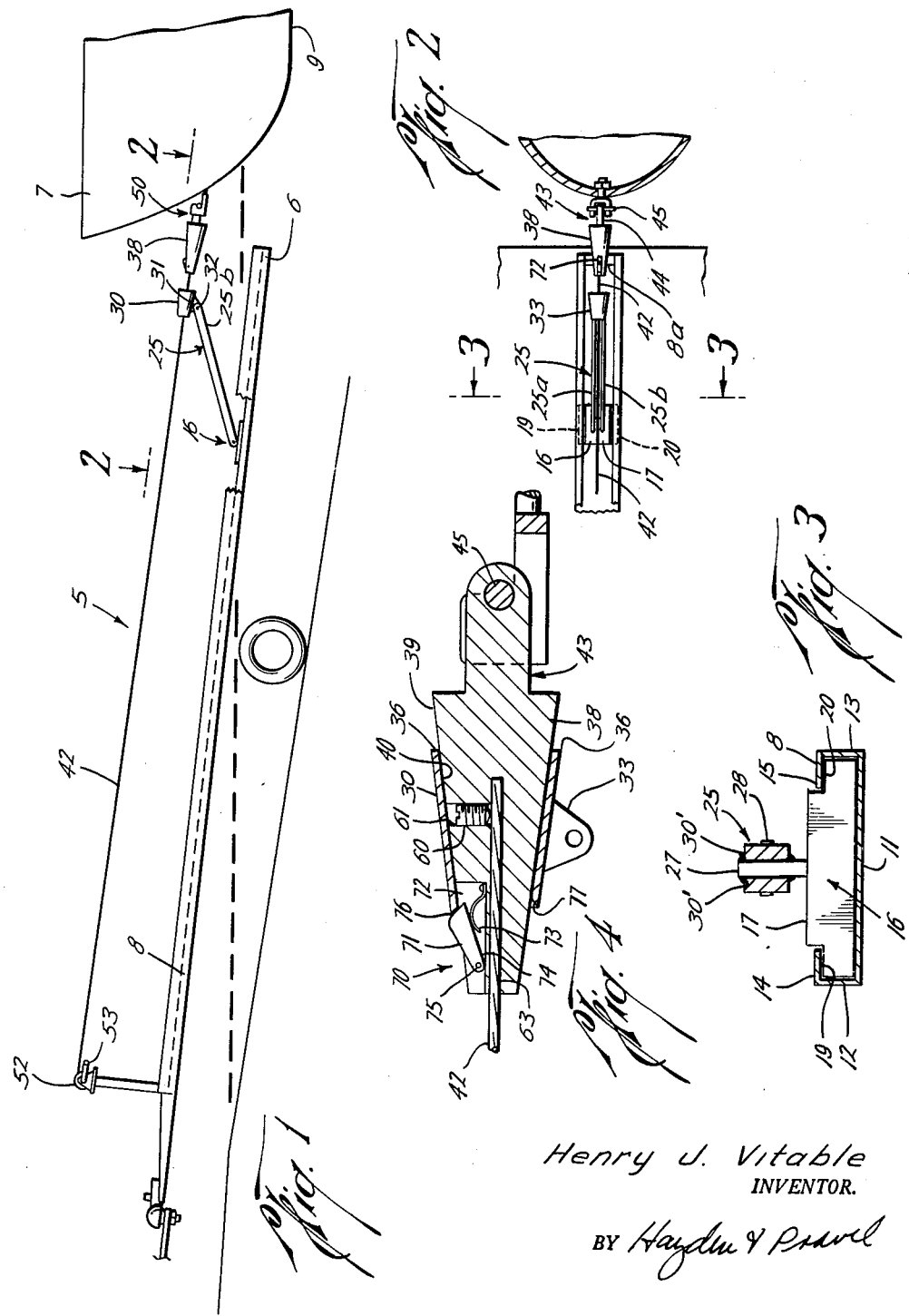

3,091,352
BOAT LOADING GUIDE
Henry J. Vitable, Houston, Tex., assignor of one-half to Barnett B. Magids, Houston, Tex.
Filed Apr. 21, 1961, Ser. No. 104,698
3 Claims. (Cl. 214—85.1)

The present invention relates to an arrangement for aligning a boat during loading onto a trailer, which arrangement is also useful for unloading the boat from the trailer.

Various types of devices have been proposed and are in use at the present time for aiding in loading a boat onto and unloading a boat from a vehicle such as a trailer; however, a great deal of difficulty is encountered in aligning a boat and in maintaining it aligned as loading operations are undertaken because of the wave and wind action on the boat.

An object of the present invention is to provide a device for aligning a boat with a trailer and for maintaining the boat in alignment with the trailer as the boat is pulled in the water toward the trailer.

Still another object of the present invention is to provide an apparatus for aiding in loading and unloading a boat from a trailer.

Still another object of the present invention is to provide an apparatus for aiding in loading and unloading a boat on a trailer.

Other objects and advantages of the present invention will become more readily apparent from a consideration of the following description and drawings wherein:

FIG. 1 is a side view illustrating the arrangement of the present invention just as a boat is ready to be loaded onto the trailer;

FIG. 2 is a view on the line 2—2 of FIG. 1 illustrating in greater detail some of the structural arrangements of the present invention;

FIG. 3 is a sectional view on the line 3—3 of FIG. 2 to show the guide track arrangement in greater detail; and FIG. 4 is an enlarged sectional view of a portion of the invention.

In FIG. 1, the invention is designated generally by the numeral 5 and is particularly adapted for use with a trailer such as represented at 6 on which the boat 7 is carried. It will be noted that a guide track is mounted on the trailer 6, such guide track being designated by the numeral 8, and extends longitudinally of the trailer 6 for a function as will be defined in greater detail hereinafter. The guide track 8 is mounted low enough in the trailer 6 so that when the boat 7 is positioned on the trailer, the bottom 9 of the boat will clear the guide track. Also, in the preferred embodiment of the invention, the guide track 8 extends axially of the trailer 6 in order to balance the boat on the trailer during movement of the trailer 6 with the boat 7 thereon, and also during loading operations thereof.

The structural arrangement of the guide track 8 is better illustrated in FIG. 3 of the drawings and is shown as including a bottom portion 11 having the vertical side portions 12 and 13 with the bent-over portions 14 and 15. Slidably mounted in the track 8 is the guide shoe or member 16 which is adapted to move in the guide track as the boat 7 is loaded onto the trailer 6, or as the boat 7 is unloaded from the trailer 6 as will be described in greater detail hereinafter.

It will be noted that the member 16 conforms with the cross-sectional configuration of the guide track 8 in that an upstanding portion 17 is provided on the upper side of the member 16, which upstanding portion is immediately adjacent the recessed portions 19 and 20 that extend longitudinally end to end of the member 16. It will be noted that the recessed portions 19 and 20 fit immediately beneath the bent-over portions 14 and 15 of the guide track 8, whereby the guide shoe 16 is retained in the track 8 as relative movement occurs therebetween.

Extending upwardly from the shoe 16 is the arm or member designated at 25 which is preferably inclined toward the rear of the trailer as viewed in FIG. 1 of the drawings. The arm 25 may be secured to the member 16 at any suitable fashion, and in the drawings is shown as being secured to the upstanding projection 27 which is mounted on the portion 17 of the guide shoe 16. If desired, a pin 28 may extend through the arm 25 and projection 27 whereupon the arm 25 may be secured to the member 16 by suitable means such as the welds 30'. This predetermines or fixes the angular relationship between the arm 25 and the guide track 8 during loading and unloading movement of the boat 7.

As shown in FIG. 3 of the drawings, the arm 25 may consist of two portions 25a and 25b which are similar in configuration and thereby provide an arrangement for pivotally mounting the female socket 30 at the upper end 31 of the arm 25. The female socket 30 may be pivotally secured to the upper end 31 of the arm 25 by any suitable means such as the pin 32 which extends through each arm portion 25a and 25b and through the depending portion 33 on the female socket 30.

As shown in the drawings, particularly in FIG. 4, the female socket 30 is in the shape of a frustrum of a cone and is hollow with its larger end, as illustrated at 36, facing toward the rear of the trailer 6. A male member, as illustrated at 38, is adapted to be received within the female socket 30 and to this end is also in the shape of a frustrum of a cone with the taper as represented by the numeral 39 mating with the taper of the female socket 30, such taper being represented by the numeral 40.

The male member 38 is adapted to be connected with a cable 42 at one end thereof, and is provided with a hook arrangement designated generally by the numeral 43 at the other end thereof. The hook arrangement 43 may assume any general configuration, and as illustrated in the drawings, includes the projection 44 which has the pin 45 extending through the end thereof. The hook arrangement 43 is adapted to engage with the boat hook designated generally at 50 in FIG. 1 whereby the boat may be pulled onto the trailer 6 and retained in position on the trailer after loading thereof. Also, the hook arrangement 43 engages the boat hook 50 during unloading of the boat 7 to aid in unloading the boat, as will be described in greater detail hereinafter.

The cable 42 extends longitudinally of the trailer 6 and is wound on a reel as designated at 52 in FIG. 1. The reel 52 may be hand operated by means of the crank 53, or motor operated as desired.

It will be further noted that the cable 42 extends through the female socket, as better illustrated in FIG. 4, and moves through the female socket 30 after the male member 38 has been disengaged therefrom, as illustrated in FIGS. 1 and 2 of the drawings.

The cable 42 may be secured by any suitable means within the male member 38, and as shown in the drawings, the Allen screw 60 is adapted to be received within the opening 61 and engages the cable 42 which is secured in the longitudinally extending opening 63 of the male member 38.

It is desirable that the male member 38 and female socket 30 be retained in interengaged relationship as the boat 7 is being unloaded from the trailer and to this end, suitable means designated generally at 70 are provided. Such means include the projecting finger 71 which is urged outwardly of the slot 72 in the smaller end of the male member 38 by reason of the spring 73 acting on the lower side 74 of the finger 71. It will be noted that finger 71 is pivotally mounted as shown at 75 and is curved on one end as illustrated at 76 to conform with the curvature 77 on the end of the female socket 30. The spring 73 is of sufficient strength so that as the boat is unloaded off the trailer, it will serve to retain the male member 38 and female socket 30 in interengaged relationship as shown in FIG. 4 of the drawings; however, after the boat has been unloaded, the finger 71 may be manually depressed, or the full weight of the boat 7 may serve to cause the finger 71 to be depressed against the action of the spring 73 whereupon the male member 38 moves out of the female socket as illustrated in FIG. 1 and in FIG 2 of the drawings. Thereafter, the hook arrangement 43 may be disconnected from the hook 50.

While it is believed that the operation of the present invention is apparent from the foregoing description, to further amplify and describe, it will be assumed, as shown in FIG. 1, that the boat 7 has been engaged by the male member 38 and that the boat 7 is to be moved onto the trailer 6. In this situation, the guide shoe 16 will be at the lower end of the guide track 8 and will abut against the bumper 8a on the lower end of the guide track, which inhibits or prevents the shoe 16 from falling out of the lower end of the guide track 8. The female socket 30 will assume the substantially horizontal configuration as illustrated in FIG. 1 of the drawings.

By reason of the cable 42 passing through the female socket 30 and its engagement with the male member 38, which male member 38 is in turn engaged with the boat hook 50 of the boat 7, the boat will be aligned with the trailer 6 even though the boat is subjected to substantial wave and wind action as it is moved toward the trailer 6. In order to pull boat 7 towards trailer 6, the reel 52 may be actuated so that a pulling effort is applied on cable 42. As the boat approaches the trailer 6, the arrangement of the male member 38 relative to the female socket 30 and the guiding action of the female socket 30 with the cable 42 therethrough will serve to stabilize and align the boat 7 with the trailer 6. After, or as the boat 7 has made contact with the rear end of the trailer 6, the male member 38 telescopes into the female socket 30, as shown in FIG. 4 of the drawings, whereupon further movement of the cable reel 52 causes the male member 38 and engaged female socket 30 to move toward the front of the vehicle or trailer 6.

When the male member 38 and female socket 30 are engaged, continued reeling of cable 42 causes the guide shoe 16 to move longitudinally of the guide track 8 until it reaches its forwardmost position therein, at which time the boat 7 is fully loaded on the vehicle 6.

To unload the boat 7 from the vehicle 6, the foregoing procedure is reversed and since the spring 73 continually urges the finger 71 into engagement with the taper or curved portion 77 of the female socket 30, the male member 38 will be retained in engaged relationship with the female socket 30 as the boat 7 is gradually lowered off the vehicle or trailer 6 into the water. About the time that the boat reaches the water and is completely launched, the guide shoe 16 reaches the end of its travel in guide track 8 and the full weight of the boat causes the finger 71 to be collapsed whereupon the member 38 moves out of the female socket 30. The boat can then be moved on out into the water as far as desired within reason and the male member 38 then disengaged from the boat.

The foregoing arrangement has been found to be particularly satisfactory in that it not only quickly aligns a boat for loading onto a trailer, but as the boat is moved towards the trailer even in heavy water, the boat maintains its alignment relative to the trailer to enable it to be placed thereon.

The present invention is also useful in that it aids in guiding the boat 7 as it is loaded onto the trailer and as the boat 7 is unloaded off the trailer.

Broadly, the present invention relates to a boat loading and unloading device and more particularly to an arrangement which aids in aligning the boat with the trailer and which maintains the alignment as the boat approaches the trailer even in relatively heavy seas. The invention also aids in guiding the boat onto a trailer and in unloading a boat from a trailer.

What is claimed is:

1. A boat loading and unloading guide for aligning a boat to be loaded on a trailer including, a guide track to be mounted on a trailer for extending longitudinally thereof, a member mounted in said track and movable therein longitudinally of the trailer, an arm extending upwardly from said member and inclined towards the rear of the trailer, a female socket pivotally mounted on the upper end of said arm, a male member for telescopically fitting in said female socket and having a means for connecting a cable on one end and for engaging a boat on the other end, a cable for securing to said male member and extending through said female socket, reel means on the trailer for winding and unwinding said cable means whereby said male member and female socket may be moved longitudinally of the trailer along said guide track as the boat is loaded and unloaded on the trailer, and means for retaining said male member telescoped in said female socket as the boat is loaded on and unloaded off the trailer.

2. The combination recited in claim 1 wherein said last named means includes a catch engaging said female socket and male member together, and a spring urging said catch to a position to engage said female socket and male member together, said spring acting to retain said socket and male member telescoped as long as the boat is being loaded onto and taken off the trailer, but yielding to release said socket and male member when the boat is launched in the water.

3. A boat loading and unloading arrangement including, a guide track for mounting longitudinally and axially of a wheeled trailer, means mounted to move in said track for aiding in unloading a boat from the trailer and launching it in water and for aiding in aligning and loading a boat onto the wheeled trailer, said means including a guide shoe positioned in said track for sliding movement therealong, an arm on said guide shoe and projecting upwardly therefrom, a socket on the upper end of said arm, a cable extending through said socket, a reel for reeling and unreeling said cable, a member to be telescopically received in said socket and secured to one end of said cable, hook means thereon for engaging with a boat to be loaded or unloaded, said guide shoe moving in said guide track and longitudinally toward the rear of the trailer as said cable is unreeled to unload the boat and moving in said guide track toward the forward end of the trailer as the boat is loaded on the trailer.

References Cited in the file of this patent

UNITED STATES PATENTS

| | | |
|---|---|---|
| 2,799,408 | Overton | July 16, 1957 |
| 2,914,200 | Bertz | Nov. 24, 1959 |
| 2,960,246 | Lovelace | Nov. 15, 1960 |
| 3,009,589 | Martz | Nov. 21, 1961 |